United States Patent

Wooldridge et al.

[11] Patent Number: 6,086,230
[45] Date of Patent: Jul. 11, 2000

[54] HIGH MOUNT DUAL LAMP

[75] Inventors: George Wooldridge, Warren; Michael Hrecznyj, Hamtramck, both of Mich.

[73] Assignee: Lear Automotive Dearborn, Inc., Southfield, Mich.

[21] Appl. No.: 08/922,802

[22] Filed: Sep. 3, 1997

[51] Int. Cl.[7] .............................. B60Q 1/30; B60Q 3/06
[52] U.S. Cl. .................. 362/503; 340/479; 362/541; 362/543
[58] Field of Search .................................. 362/490, 503, 362/541, 543, 544, 546; 340/463, 464, 468, 461, 479

[56] References Cited

U.S. PATENT DOCUMENTS 4,896,136  1/1990  Hotovy ..................................... 340/468

Primary Examiner—Cassandra Spyrou
Assistant Examiner—Craig Curtis
Attorney, Agent, or Firm—MacMillan, Sobanski & Todd, LLC

[57] ABSTRACT

An assembly mounts the rear stop lamp and the rear cargo lamp in a rear cargo door of a vehicle at adjacent locations. A single control board mounts both lamps. The boards can have different configurations. However, in each embodiment a single board preferably provides power and control signals to the stop lamp and the cargo lamp. In this way, the number of parts necessary for providing the lamps are reduced. In addition, since the lamps are mounted adjacent to each other, a single space may be utilized for both lamps. Various types of lamps may be utilized within the scope of this invention.

5 Claims, 3 Drawing Sheets

HIGH MOUNT DUAL LAMP

BACKGROUND OF THE INVENTION

This invention relates to a combined rear cargo lamp and rear stop lamp for the cargo door of a vehicle.

In the prior art, pivoting doors in vehicles are often associated with a cargo lamp near the top of the door. This lamp illuminates the interior of the vehicle. In addition, the rear cargo doors are typically provided with a stop lamp at some position.

In the prior art, the rear cargo lamp and the rear stop lamp are mounted as separate members which are not positioned adjacent to each other. Thus, the entire control structure for both lamps must be separately provided. Each lamp must be provided with its own control board and power supply.

In addition, the space through the thickness of the cargo door of a vehicle is relatively limited. It would be desirable to require as little space as possible for the provision of both lamps. Since the prior art mounts the rear cargo lamp and the rear stop lamp in distinct positions, the prior art has required that space be provided at two distinct locations for the necessary lamp components.

In summary, the prior art has typically utilized two distinct lamps mounted at two distinct locations. Thus, there have been two control boards necessary. Further, within the door there has been the requirement for space for both of the lamps.

SUMMARY OF THE INVENTION

In disclosed embodiments, the rear cargo light and the stop lamp are associated such that they are spaced adjacent from each other on opposite sides of the door. Thus, a single control board may be utilized for both the interior lamp and the stop lamp. In addition, since the lamps are mounted in adjacent locations, space for the lights within the door is only necessary at a single location.

In one embodiment, a control board extends generally horizontally, and both lamps are mounted to the control board. In a second embodiment, the control board has a 90° bend with a first horizontal portion and the second vertical portion. One lamp is mounted in the horizontal portion and a second lamp is mounted in the vertical portion. In a third embodiment, the control board extends generally vertically with both lamps mounted to the control board.

Various types of lamps can be utilized. A first-type lamp is the type held in electric communication by fingers which communicate electric energy to the lamps. In a second type, the lamps are of the type which plug into a control board. In another option, the lamps associated with the board are hard-wired. Again, any type of lamp may be utilized within the scope of this invention. Further, the two lamps may be of different types from each other.

These and other features of the present invention can be best understood from the following specification and drawings, the following of which is a brief description.

DETAILED DESCRIPTION OF A PREFERRED EMBODIMENT

Figure 1:
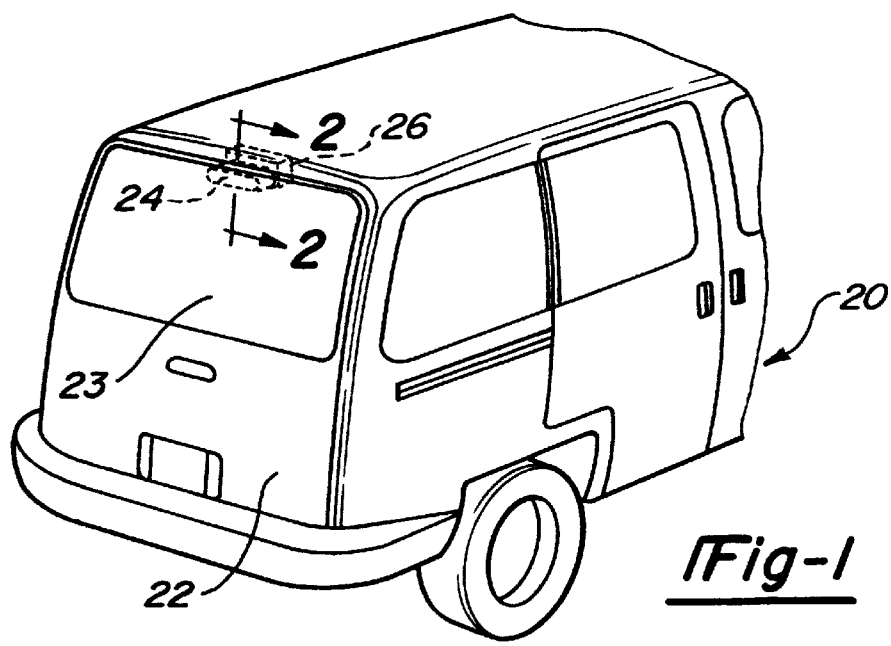
FIG. 1 shows a vehicle incorporating the present invention.

As shown in FIG. 1, vehicle 20 has a pivoting rear cargo door 22 with a rear window 23, as known. A rear stop lamp 24 is provided in the window 23, and is spaced directly forwardly of, and adjacent to, an interior cargo lamp 26.

Figure 2:
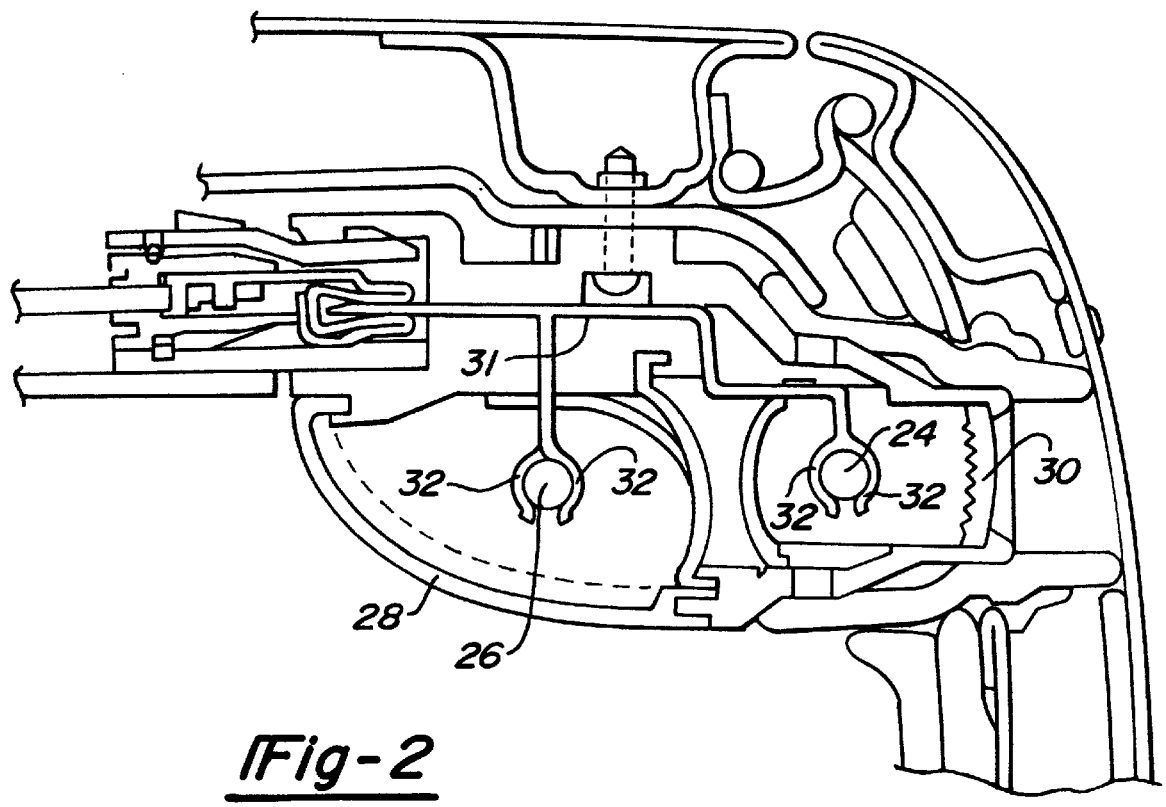
FIG. 2 is a cross-sectional view along line 2—2.

As shown in FIG. 2, a lens 28 is associated with lamp 26 and a lens 30 is associated with lamp 24. Since the lamps are mounted adjacent each other. A single control board 31 may be utilized to provide electrical communication to and from the lamps 24 and 26. Further, only a single area is necessary for both lamp components.

Figure 3:
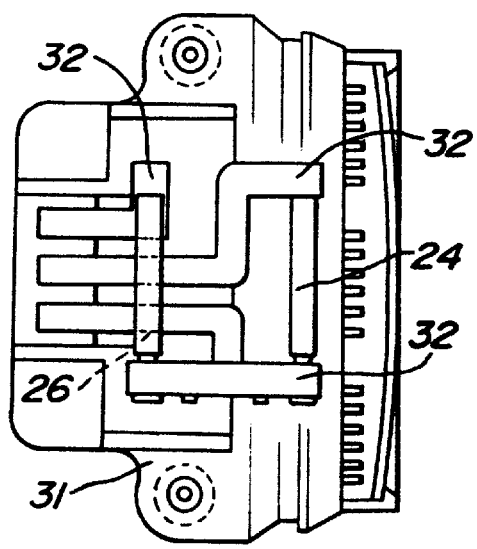
FIG. 3 shows a top view of a portion of the FIG. 2 lamp.

Lamps 24 and 26 are of the type wherein terminal fingers 32 grip each end of the lamp to provide electrical power. This type of lamp is known. As shown in FIG. 3, the terminal fingers 32 grip each end of the lamp 26, and communicate with the board 31.

Figure 4:
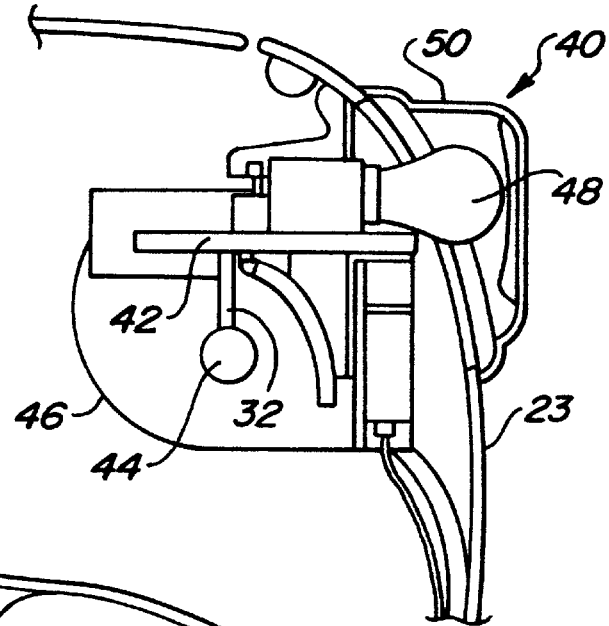
FIG. 4 shows another embodiment control board.

FIG. 4 shows another embodiment 40 wherein a single control board 42 extends horizontally, and mounts interior cargo lamp 44 of the general type described above, received in fingers 32. A lens 46 is positioned in front of lamp 44. A second lamp 48 of the type which plugs into board 42 provides the stop light. As shown, lamp 48 extends through the window 23, and lens 50 is positioned outside of window 23. Again, the type of lamp 48 which plugs into the board is known. It is the positioning of lamps 44 and 48 together which is the inventive feature.

Figure 5:
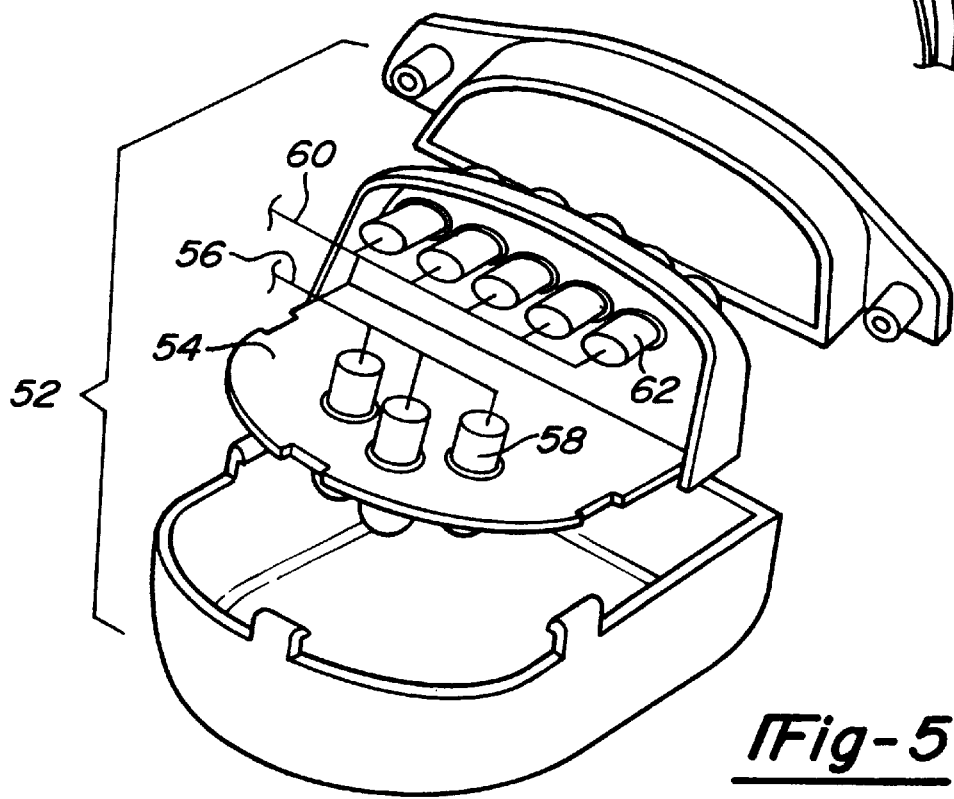
FIG. 5 shows another embodiment control board.

FIG. 5 shows another embodiment 52 wherein a control board 54 receives a control wire 56 associated with a series of hard wired lamps 58. Lamps 58 are mounted by snapping into openings in board 54. A second wire 60 provides electrical communication to lamps 62, again which are hard wired lamps. Lamps 62 provide the stop lamp feature, while the lamps 58 provide the rear cargo lamp. Lamps 58 are mounted in a horizontally extending board portion while lamps 62 are mounted in a vertically extending board portion.

Figure 6:
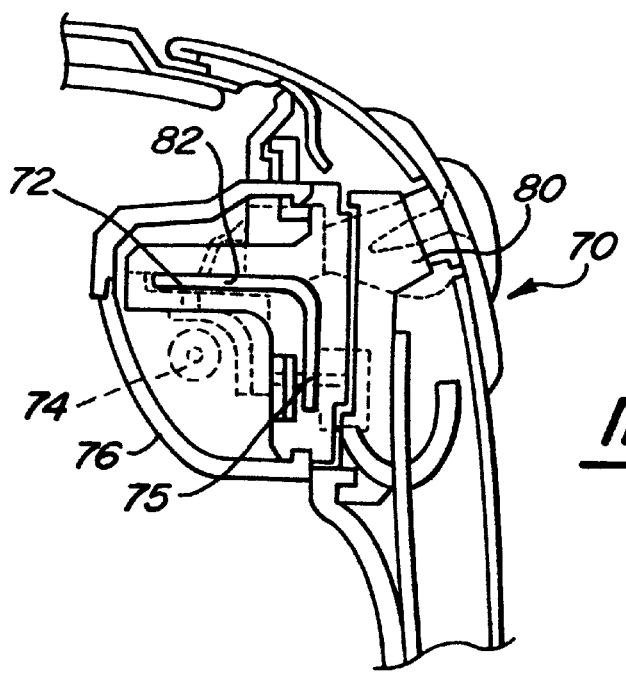
FIG. 6 shows yet another embodiment control board.

FIG. 6 shows another embodiment 70 having control board 72 mounting a rear cargo lamp 74 of the mechanical finger type, and associated with a lens 76. Lamp 74 is associated with a portion 75 of the board 72 which extends generally vertically. The stop lamp 80 is associated with an upper horizontally extending portion 82 of the board 72. Again, by arranging the lamps in this way, a single control board may be utilized to provide power and control to both lamps.

Figure 7:
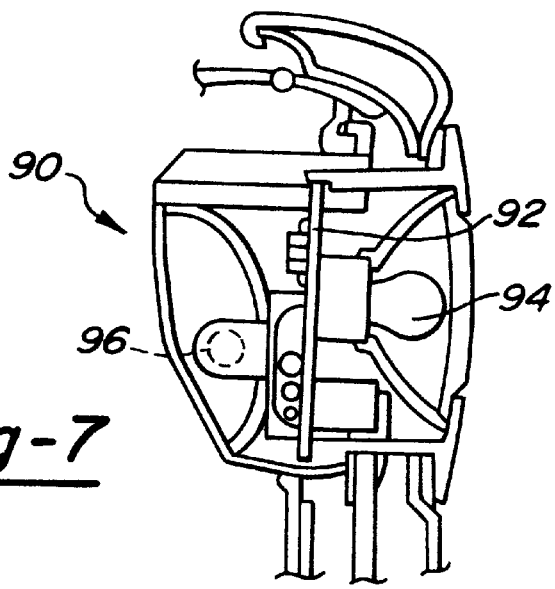
FIG. 7 shows yet another embodiment control board.

FIG. 7 shows yet another embodiment 90 wherein the control board 92 extends vertically, and provides communication to lamps 94 for the stop lamp and the lamp 96 for the rear cargo lamp.

Although preferred embodiments of this invention have been disclosed, a worker of ordinary skill in the art would recognize that many modifications would come within the scope of this invention. For that reason the following claims should be studied to determine the true scope and content of this invention.

We claim:

1. A vehicle rear cargo door which pivots upwardly comprising:

a rear window in a rear cargo door;

a rear stop lamp associated with said rear window and facing outwardly of said rear window;

a rear cargo lamp associated with said rear window and facing into the interior of the vehicle receiving said rear cargo door; and said rear stop lamp and said rear cargo lamp being mounted adjacent to each other and extending across a thickness of said rear cargo door.

2. A door as recited in claim 1, wherein said rear stop lamp and said rear cargo lamp are both mounted into a single control board.

3. A door as recited in claim 2, wherein said single control board extends generally horizontally, with both said lamps being mounted to said generally horizontally extending control board.

4. An assembly as recited in claim 2, wherein said single control board extends generally vertically, with both of said lamps being mounted to said generally vertically extended control board.

5. An assembly as recited in claim 2, wherein said single control board has a first generally horizontally extending portion which mounts one of said lamps and a second generally vertical portion which mounts the other of said lamps.

\* \* \* \* \*